June 11, 1957  W. A. HASBANY  2,795,309
FLUID OPERATED CLUTCH AND VALVE THEREFOR
Filed May 28, 1951  2 Sheets-Sheet 2

INVENTOR.
Woodrow A. Hasbany
BY
ATTORNEYS.

United States Patent Office 2,795,309
Patented June 11, 1957

2,795,309

FLUID OPERATED CLUTCH AND VALVE THEREFOR

Woodrow A. Hasbany, South Bend, Ind., assignor, by mesne assignments, to Studebaker-Packard Corporation, a corporation of Michigan Application May 28, 1951, Serial No. 228,601

12 Claims. (Cl. 192—85)

The present invention relates to a valve and particularly to an improved pressure relief valve adapted to vent a pressure chamber when the pressure therein falls within a range between a desired upper limit and a permissible lower limit.

By way of example, the invention has particular utility for use with hydraulic and pneumatic clutch units for hydraulic and pneumatic transmission mechanisms. In such mechanisms, fluid under pressure is utilized to effect clutching of a pair of elements together for conjoint movement to provide a desired ratio of drive through the transmission. When fluid force is not applied, as for example, to effect a shift in the transmission, the pair of members are separated, or should be separated, to allow relative movement therebetween. However, in most units and mechanisms, the presence of residual fluid causes a partial lock or engagement between the members and results in an undesired or unauthorized actuation of the mechanism or unit, wear and damage to the particular members being coupled and/or wear or damage to the entire unit or mechanism. In some instances, the lock-up caused by the presence of residual fluid results in the destruction of the apparatus.

Thus, in an automatic hydraulic transmission, hydraulic fluid under pressure effects engagement between two normally spaced and relatively rotatable members to provide one of the speed ratios of the transmission. When the pressure on the fluid is relieved, the members are separated by spring force and other mechanisms are actuated to provide other speed ratios. One of the said two members normally continues to rotate, however, and the residual fluid remaining in the pressure chamber is acted upon by the rotating member with the effect that pressure is again built up due to centrifugal effect with the result that the two members are moved relatively to effect a partial engagement thereof. Upon engagement of the two members, either one or all of the following will occur: The transmission ratio will be unauthorizedly changed; either or both of the members will be damaged or become worn; and other elements of the transmission will be damaged or become worn.

An object of the present invention is to provide means for relieving the pressure build-up in the residual fluid to prevent undesired or unauthorized actuation of cooperating elements or members in clutches, transmission and the like.

A further object of the invention is to provide valve controlled vent passages for relieving undesired pressure build-up in hydraulic or pneumatic apparatus.

A still further object of the invention is to provide valve controlled vent means for relieving pressures less than a predetermined maximum, which means are closed to prevent relief of pressures in excess of said predetermined maximum.

In mechanisms of the type referred to, pressure is purposely applied to actuate the mechanism and is later relieved to discontinue the operation or operative connection of the mechanism. Therefore, if vent means are provided for relieving pressure build-up in the residual fluid to prevent accidental or unauthorized actuation, means must be provided to render the vent ineffectual when pressure is purposely applied to the fluid. When the mechanism is purposely actuated, the pressure is applied in a sudden surge, whereas the pressure build-up in the residual fluid is gradual. The present invention takes advantage of these factors by providing valve means for the pressure chamber vent, which is moved to closed position upon occurrence of pressure surge, but remains open when subjected to gradual pressure rise.

According to the present invention, vent means are provided for a pressure chamber having a movable wall, and valve means are provided for the vent means, the valve means having operative connection with the movable wall of the chamber to be moved in accordance with movement of said wall. The arrangement and cooperation of the elements is such that a sudden surge of pressure will move the movable wall of the chamber a predetermined magnitude sufficient to move the valve means to close the vent means, and such that the vent means is effective to vent the chamber of lesser pressures tending to effect a gradual movement of the movable wall of the chamber before the wall is moved the magnitude aforesaid.

In a broader aspect, the invention contemplates the provision of a pressure chamber having a main cavity defined by a stationary member and a movable member and a secondary cavity defined by a portion of the stationary member and a portion of the movable member. In normal position, the secondary cavity communicates with a fluid source, the main cavity is vented and the two cavities are not in communication with one another. Upon actuation, relative movement is effected between the members to establish communication between the two cavities. If the relative movement is gradual and slight, the main cavity will remain vented and pressure relief will be accomplished. If the actuating pressure application is sudden, the relative movement will be sudden and of such magnitude as to effect closing of the vent means, due to the operative connection between the valve means and the movable member, before actuating fluid can charge the main cavity and be vented during initial movement of the member.

From the foregoing, it will be appreciated that an object of the present invention is to provide valve controlled vent means for pressure chambers, effective to vent pressure fluid in an intermediate pressure range only when pressure actuation of the apparatus controlled by the chamber would prove undesirable or unauthorized.

These and other objects and advantages of the present invention will become apparent in the following detailed description of preferred embodiments of the invention wherein reference is made to the accompanying drawings, in which preferred embodiments have been shown as applied, by way of example, to an automatic hydraulic transmission mechanism.

Figure 1:
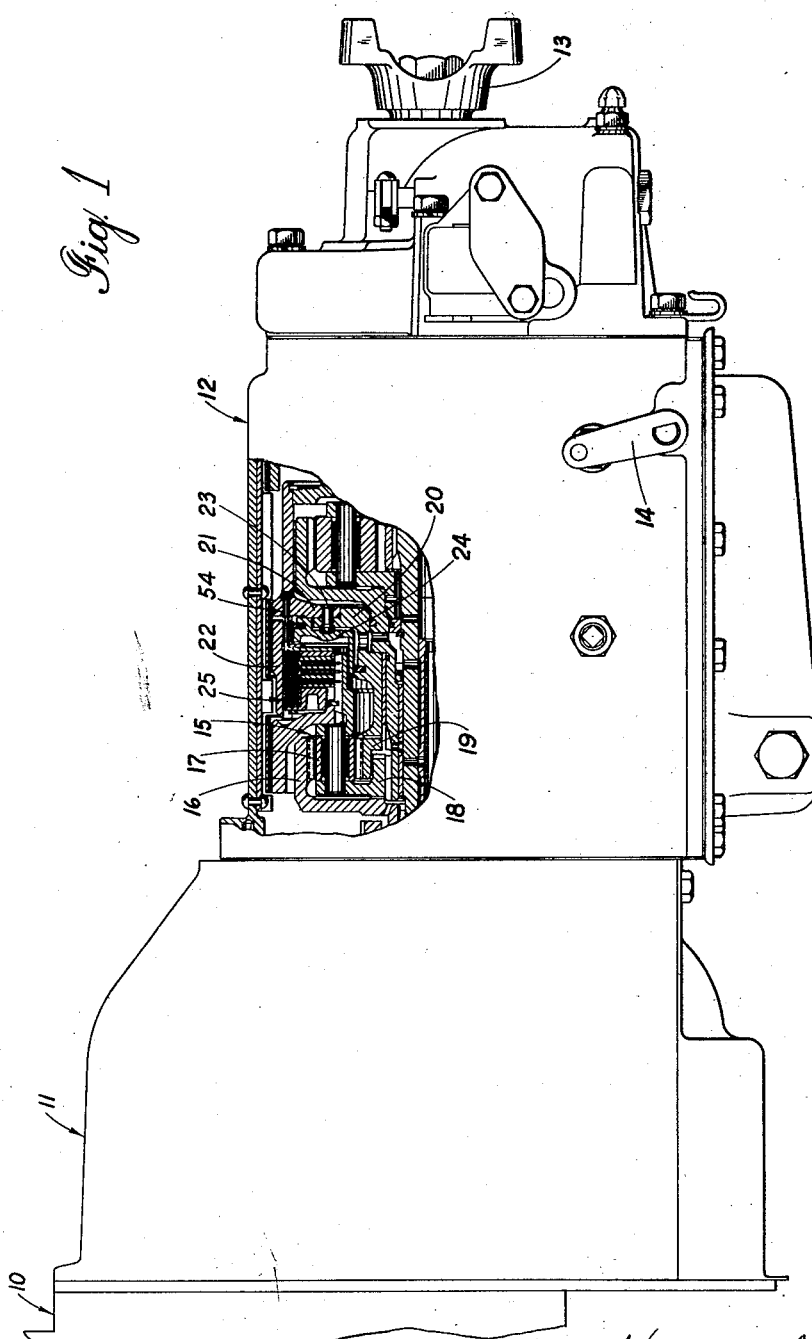
Figure 1 is a side elevation of the transmission means for a prime mover, a portion of the transmission means being broken away to show, in vertical longitudinal cross section, a portion of the transmission means.

Referring to the drawings, the present invention has been shown, by way of example, as applied to a transmission mechanism. A prime mover 10, having driving connection through a flywheel housing 11 with a transmission means 12, is adapted to drive a driven shaft 13 at various speed ratios. The transmission means 12 is provided with a shift lever 14 for effecting actuation of the transmission means to obtain various speed ratios between the drive shaft of the prime mover 10 and the driven shaft 13.

The transmission means 12 includes a planetary gearing system, indicated generally at 15. The planetary gearing system or arrangement includes an internally toothed ring gear 16, a plurality of planet gears 17 rotatably mounted in a planet gear carrier 18 and a sun gear 19. Either the internally toothed ring gear 16 or the sun gear 19 may be connected to the drive shaft of the prime mover, the other of the two gears being connected to the driven shaft directly or indirectly. The complete details of the transmission means 12 form no part of the present invention, and therefore, the description is limited to portions thereof providing the application of the present invention, namely, the planetary gearing 15.

The sun gear member 19 is generally cylindrical and is provided, at its end opposite the sun gear, with an outwardly directed radial flange 20 to which an inwardly directed flange 21 of an outer drum 22 is secured by rivets or like fastening means 23. The sun gear member 19, the drum 22 and their flanges define an annular chamber for the reception of an annular piston or movable wall member 24 and a clutch assembly, indicated generally at 25. The annular chamber defined by the sun gear member 19 and the drum 22 is of reduced size at the end adjacent the flanges 20 and 21 for the reception of the piston 24. An annular sealing ring 26 is positioned within a circumferential groove in the sun gear member 19 to seal against one side of the piston 24. The piston 24 is provided at its opposite or outer side with a circumferential groove for the reception of an annular sealing ring 27 adapted to sealingly engage the inner surface of the drum 22 to define and seal off an expansible or variable volume pressure chamber 28 between the piston 24 and flanges 20 and 21.

The clutch assembly 25 is positioned within the main or enlarged portion of the annular chamber defined by the members 19 and 22 and comprises an annular pressure plate 29, a plurality of annular clutch discs 30 and an end plate 31. The clutch plates and discs are retained within the chamber defined by the members 19 and 22 by means of an expansible ring 32 fitted into a groove in the inner surface of the drum 22. The pressure plate 29 and the end plate 31 are each provided with outwardly projecting radial extensions between which a plurality of coil springs 33 are compressed. The springs 33 normally bias the plates 29 and 31 away from each other and against stops provided by an internal shoulder 34 on the drum 22 and the ring 32. The sun gear member 19, the outer drum 22, the piston 24 and the clutch assembly 25 are arranged and operatively associated for conjoint rotational movement and the piston 24 is mounted for sliding movement within the chamber defined by the sun gear member 19 and the outer drum 22. Clutch assembly 25 further includes a plurality of clutch discs 35 to opposite faces of which annular discs of friction facing material 36 are applied. The clutch discs 30 are normally spaced apart for the free reception therebetween of the clutch discs 35.

The planet gear carrier 18 is normally mounted for relative rotational movement with respect to the sun gear member 19 and the associated members and apparatus. The planet gear carrier 18 comprises a generally cylindrical member having an outwardly directed bifurcated flange portion 37 at one end. The planet gears 17 are rotatably received within the bifurcated flange portion 37 and are arranged to mesh with the internal ring gear 16 and the sun gear 19. At its end opposite the flange portion 37, the carrier 18 is provided with a splined portion 38. The clutch discs 35 are provided with inwardly directed radial extensions 39 arranged to be slidably received within the grooves provided by the splined portion 38 to operatively associate the clutch discs 35 and the carrier 18 for conjoint rotational movement while accommodating relative linear or axial movement.

The sun gear member 19 is provided with a port 40 establishing communication between a pressure fluid source and the pressure chamber 28. In operation, the sun gear 19 is normally rotated with respect to the carrier 18. Upon proper actuation of the lever 14, or automatically, fluid under presure is forced through the port 40 into the chamber 28 to effect movement of the piston or movable wall member 24. Movement of the piston 24 effects movement of the pressure plate 29 toward the end plate 31 against the compressive force of the springs 33 to force the clutch discs 30 into intimate engagement with the friction facing discs 36 on the clutch discs 35 to clutch the discs 30 and 35 together for conjoint movement. Since the discs 30 are locked to the sun gear member 19 for rotational movement and the clutch discs 35 are locked to the planet gear carrier 18 for rotational movement, the carrier 18 and the sun gear member 19 are locked together for conjoint movement to achieve one driving ratio of the transmission. To discontinue the particular driving ratio, the pressure is relieved and most of the fluid will be returned to the transmission sump or reservoir, but some will remain in the chamber 28. As the sun gear member 19 continues to rotate, fluid will be thrown to the outer periphery of the chamber 28 by centrifugal force. As speed is increased, pressure will be built up in the residual or remaining fluid and will cause actuation of the piston 24, which will result, in devices not equipped with the valve means of the present invention, in partial engagement of the clutch discs 30 and 35. Such engagement will cause the friction facings 36 or the clutch discs 30 and 35 themselves to wear out, or will cause a lock-up of the carrier 18 and the member 19 depending upon the particular operating conditions of the transmission. In either case, the results are decidedly undesirable and render the mechanism substantially unuseable for the purpose for which it is intended. It is therefore apparent that the residual fluid must be removed from the pressure chamber to prevent or relieve such pressure build-up therein as would effect partial or complete engagement of the clutch elements. The residual fluid is not harmful to the operation of the transmission mechanism unless the pressure build-up therein is of such magnitude as to effect actuation of the piston 24. The present invention, therefore, is directed to the relief of pressure built up in the residual fluid.

To effectively accomplish relief of pressure build-up in the residual fluid in the pressure chamber, the present invention contemplates forming the piston or movable wall 24 in such manner that same is provided with a portion 50 arranged to engage the flange 21 of the outer drum 22 in the normal position of the piston 24 as defined by the bias of the springs 33. The piston portion 50, due to its engagement with the flange 21, effectively divides the pressure chamber 28 into an inner annular cavity 51 and an outer annular cavity 52. The inner annular cavity 51 communicates directly with the port 40 for reception of pressure fluid from the pressure source. As fluid enters the cavity 51 under pressure from the fluid source, pressure is very rapidly built up in the cavity 51 to move the piston 24 against the compressive force of the spring 33. As soon as the portion 50 of the piston 24 moves away from the flange 21, the effective area of the piston 24 is increased and the piston, therefore, is rapidly moved to effect engagement of the clutch discs 30 and 35. The rapid movement of the piston 24, due to the exposure of increased piston area, is similar to the poppet action of valves.

The outer annular cavity 52 is normally vented to atmosphere or to the fluid reservoir or sump by means of a vent port 53 provided in the outer drum 22. The port 53 is normally open, but it is apparent that if the port were allowed to remain open at all times, venting of the actuating pressure fluid would occur upon purposeful actuation of the piston, with the result that the clutch discs 30 and 35 would not be firmly engaged with one another. Accordingly, a valve 54 is provided for closing the port 53 when pressure is admitted to the cavity 51 through the port 40.

The valve 54 is preferably a spool valve having a reduced central portion 55 normally aligned with or intersecting the vent port 53 to allow venting of the cavity 52. The valve 54 is provided with enlarged end portions 56 intimately and slidably engaged in a bore 57 in the shoulder portion 34 of the outer drum 22. The bore 57 extends parallel to the axis of the piston 24 and is vented at one end by a bore 58 in the drum 22 and at its other end directly into the clutch assembly chamber. The diameter of the bores 57 and 53 are preferably the same, or the diameter of the bore 57 is larger than that of the bore 53, so that the enlarged end portions 56 of the valve 54 will effectively block off the vent port 53 when the valve is moved to have an end portion thereof intersecting the vent port 53 to prevent venting.

Valve 54 is operatively associated with piston 24 and clutch assembly 25 for actuation simultaneously with the piston. Upon introduction of pressure fluid and the occurrence of the poppet action of the piston 24, the valve is moved to bring one of the enlarged end portions 56 into alignment with, or intersecting association with, the vent port 53 to prevent venting of the cavity 52 and thusly, of the pressure chamber 28.

When pressure is built up in the residual fluid, due to centrifugal effect, the piston 24 will be moved to disengage the portion 50 thereof from the flange 21. However, the volume of residual fluid in the cavity 51 is not sufficient to effect a poppet action of the piston 24 and, therefore, the residual fluid flows into the outer chamber 52 and is vented through the vent port 53. In operation then, the introduction of pressure fluid through the port 40 into the cavity 51 will effect a rapid poppet action or movement of the piston 24 with the result that the valve 54 will be moved to close the vent port 53 before any, or before any measurable amount of fluid can escape through the vent port 53. When movement of the piston 24, however, is effected due to pressure built up in the residual fluid in the chamber 51, the movement of the piston 24 will be gradual and slight so that the fluid will be vented through the port 53 to relieve the pressure chamber 28 before the piston 24 can be moved to such extent as to close the vent port 53 and effect engagement between the clutch discs 30 and 35.

Figure 2:
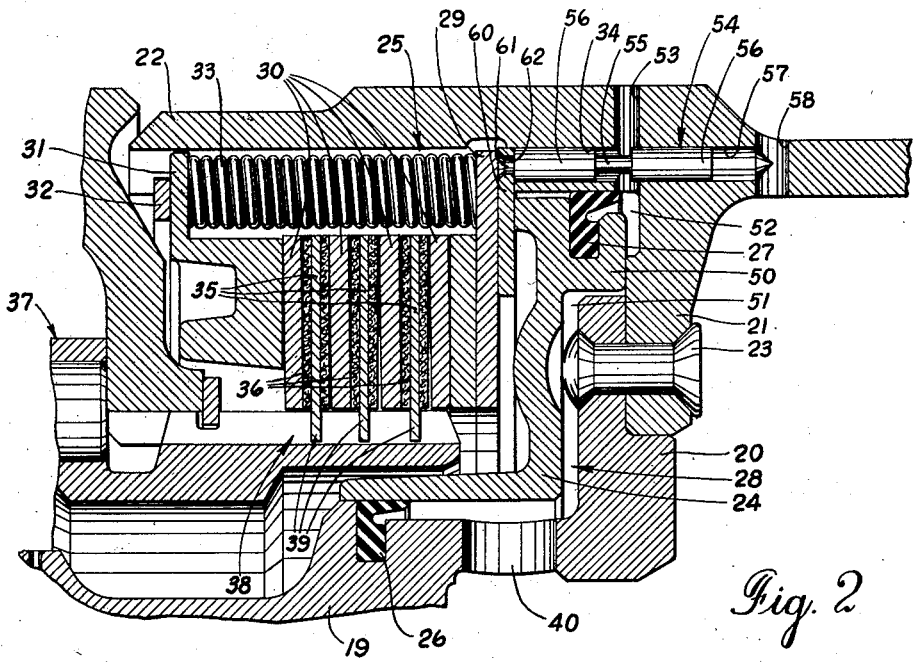
Figure 2 is a cross sectional view of a clutch assembly embodied in the portion of the transmission means shown in Figure 1, with the valve means of the present invention associated therewith.
Figure 3:
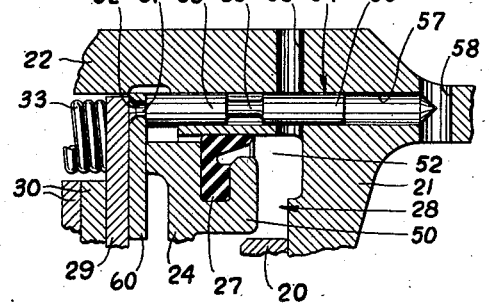
Figure 3 is a sectional view of a portion of Figure 2 showing the valve means of the present invention moved to closed position.

In the drawings, I have shown two embodiments of my invention, both including all of the foregoing. In one embodiment, the valve actuation is directly effected by the piston 24 and in the other embodiment, the valve 54 is spring actuated in accordance with movement of the piston 24. Referring to Figures 2 and 3, an annular disc 60 is positioned between the pressure plate 29 and the piston 24 for movement conjointly therewith. The valve 54 is provided with a reduced end extension 61 arranged to be received within a hole 62 in the disc 60. The end of the reduced extension 61 is peened over or is spread to lock the valve 54 and the disc 60 together. It will be apparent that upon actuation of the piston 24, disc 60 and valve 54, will be moved conjointly with the piston 24.

Figure 4:
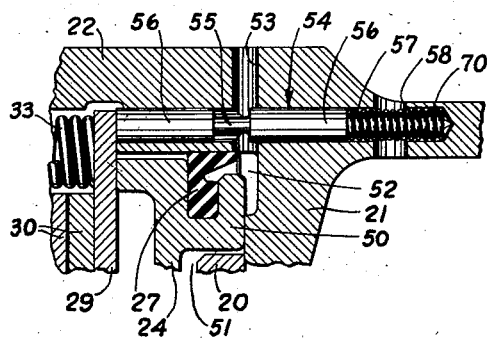
Figure 4 is a view similar to Figure 3 of a modified embodiment of the valve means of the present invention, showing the valve means in open position.
Figure 5:
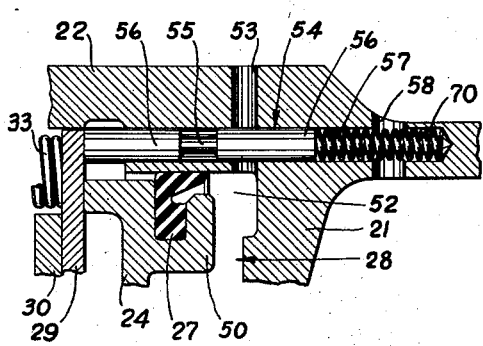
Figure 5 is a view similar to Figure 4, showing the modified valve means of Figure 4 in closed position.

Referring now to Figures 4 and 5, a valve actuating spring 70 is positioned in the end of the bore 57 and it is compressed between the end wall of the bore 57 and the valve 54. The other end of the valve 54 is forced by the spring 70 into engagement with one face of the pressure plate 29. As the pressure plate is moved under the surge of the piston 24, the spring 70 causes the valve 54 to follow that movement and thusly effect closing of the valve 54. When the pressure in the chamber 28 is relieved from the fluid pressure source, the springs 33 return the pressure plate 29 and therefore the valve 54 to its original position.

As previously noted, preferred embodiments of the present invention have been shown and described as applied to a hydraulic transmission mechanism, solely by way of example. It will be apparent that the pressure release valve of the present invention may readily be applied to any similar situation and construction. For example, the piston or movable wall could be replaced by a flexible diaphragm or the like. Therefore, it is to be born in mind that the relief valve of the present invention is applicable to all expansible or variable volume pressure chambers having relatively movable portions defining the chamber. The vent port is provided in one of the relatively movable portions and the valve is operatively associated with the other of the portions, so that actuation of the valve is in accordance with the relative movement between the portions. Therefore, the term "movable wall" as used herein, is to be considered as including pistons, diaphragms, and other relatively movable portions of variable volume pressure chambers.

In describing and showing the present invention, I have referred to a single vent port and valve therefor. It will be apparent that a plurality of ports and valves can be provided around the periphery of the pressure chamber as desired, and that modifications may be made in the location and size of the ports to meet the demands of various installations.

While I have described what I regard to be preferred embodiments of my invention, it will be apparent that variations, modifications, changes and rearrangements may be made without departing from the spirit and scope of the present invention, as defined by the appended claims.

I claim:

1. A pressure relief valve for a variable volume pressure chamber defined by a member having a cavity therein and a relatively movable wall member closing the cavity, the wall member having portions normally engaging portions of the cavity member to define a cavity of reduced area within the pressure chamber, a fluid inlet being provided communicating with said cavity of reduced area, comprising a vent port in one of said members in communication with the pressure chamber outside said cavity of reduced area, and a valve operatively associated with the other of said members for movement with respect to said port in accordance with relative movement between said members, said valve being so mounted with respect to said port as to close said port after disengagement of the said portions of said members and after a predetermined magnitude of relative movement between said members beyond disengagement of said portions of said members.

2. A pressure relief valve for a variable volume pressure chamber defined by a cylinder and a piston, comprising a vent port in said cylinder communicating with the pressure chamber, and a valve mounted for movement with respect to said port operatively associated with said piston for movement in accordance therewith, said piston having portions normally engaging said cylinder to divide said present chamber into an inner cavity and an outer cavity, a fluid inlet port being provided establishing communication between the inner cavity and a source of fluid under pressure, said piston being mounted for movement in response to introduction of fluid into said inner cavity from the fluid source to establish communication between said cavities, said vent port being in communication with said outer cavity, said valve being so mounted with respect to said port as to close said port after a predetermined magnitude of movement between said piston and said cylinder in excess of the movement required to establish communication between said cavities.

3. A pressure relief valve for a variable volume pressure chamber defined by a cylinder member and a movable wall member, comprising a vent port in said cylinder member, a bore in said cylinder member intersecting said port, a spool valve slidably mounted in said bore, said valve having a reduced portion normally intersecting said port whereby said port is normally open, said valve having an enlarged portion of a size to close said port when moved to intersect said port, said valve being operatively associated with said movable wall member for movement with respect to said port in accordance with relative movement of said movable wall member, said members including normally engaging portions defining a cavity of reduced volume in the pressure chamber, and a fluid inlet in communication with said cavity, said vent port communicating with the pressure chamber outside said cavity, said wall member being movable first to establish communication between said cavity and the remainder of the pressure chamber and said vent port and thereafter being movable to enlarge the pressure chamber, said port being so positioned with respect to said enlarged portion of said valve that said port is closed by said enlarged portion of said valve after a predetermined magnitude of relative movement between said members in excess of that required to establish communication between said cavity and the remainder of the pressure chamber.

4. In fluid actuated clutch and transmission mechanisms, a plate, means for moving said plate in one direction, a cylinder member, and a movable wall member movably mounted in said cylinder member and defining therewith a pressure chamber, said movable wall member being adapted to be moved by fluid under pressure introduced into said pressure chamber to move said plate in the opposite direction; means for preventing accidental actuation of the plate due to the presence of residual fluid in the pressure chamber, said means including a pressure relief valve comprising a vent port in said cylinder member communicating with said pressure chamber, a bore in said cylinder member intersecting said port and having its open end adjacent said plate, and a valve movably mounted in said bore, said valve having a reduced portion normally intersecting said port whereby said port is normally open and having an enlarged portion adapted to be moved to intersect said port to close said port, said valve being operatively associated with said plate for movement in accordance therewith, said wall member and said cylinder member having normally engaging portions dividing the pressure chamber into an inner annular cavity and an outer annular cavity, and a fluid inlet in communication with said inner cavity, said vent port communicating with said outer cavity, said wall member being movable first to establish communication between said cavities and said vent port and thereafter being movable to enlarge the pressure chamber, said valve being so mounted with respect to said port that said enlarged portion thereof is moved to intersect and close said vent port upon movement of said plate and said wall member a predetermined magnitude in excess of the said first movement of said wall member in response to fluid actuation of said wall member.

5. In fluid-actuated clutch and transmission mechanisms, a plate, means for moving said plate in one direction, a fluid-actuated piston for moving said plate in the opposite direction, and a cylinder member within which said piston is slidably mounted, said piston and cylinder member defining a pressure chamber therebetween, said cylinder member being mounted for rotation; means for preventing accidental actuation of the plate due to the presence of residual fluid in the pressure chamber, said means including a pressure relief valve comprising a vent port in said cylinder member communicating with the pressure chamber defined by said cylinder member and said piston, a bore in said cylinder member adjacent the periphery thereof, said bore extending parallel to the axis of rotation of said cylinder member and intersecting said port and having its open end positioned adjacent said plate, a spool valve movably mounted within said bore, and a valve actuator confined between said plate and said piston, said valve being fixedly secured to said actuator for movement therewith in accordance with movement of said plate and said piston, said piston and said cylinder member having normally engaging portions dividing the pressure chamber into an inner annular cavity and an outer annular cavity, and a fluid inlet in communication with said inner cavity, said vent port communicating with said outer cavity, said piston being movable first to establish communication between said cavities and said vent port and thereafter being movable to enlarge the pressure chamber, said valve being so mounted in said bore that said port is open when said plate and piston are moved to a normal position by said first named means and that said port is closed when said plate and said actuator are moved a predetermined distance in excess of the said first movement of said piston in response to fluid actuation of said piston.

6. In fluid-actuated clutch and transmission mechanisms, a plate, means for moving said plate in one direction, a fluid-actuated piston for moving said plate in the opposite direction, and a cylinder member within which said piston is movably mounted, said piston and cylinder member defining a pressure chamber therebetween, said cylinder member being mounted for rotation; means for preventing accidental actuation of the plate due to the presence of residual fluid in the pressure chamber, said means including a pressure relief valve comprising a vent port communicating with said pressure chamber, a bore in said cylinder member adjacent the periphery thereof, said bore extending parallel to the axis of rotation of said cylinder member and intersecting said port and having its open end positioned adjacent said plate, a spool valve movably mounted in said bore and having a portion extending from said bore and engaging said plate, and a spring confined within said bore and urging said valve towards said plate, said piston and said cylinder member having normally engaging portions dividing the pressure chamber into an inner annular cavity and an outer annular cavity, and a fluid inlet in communication with said inner cavity, said vent port communicating with said outer cavity, said piston being movable first to establish communication between said cavities and said vent port and thereafter being movable to enlarge the pressure chamber, the valve being so positioned in said bore that said port is open when said plate and piston are retained in one position under the urge of said first named means and that said port is closed by said valve when said plate is moved a predetermined distance in excess of the said first movement of said piston in response to fluid actuation of said piston.

7. In a fluid actuated variable volume pressure chamber means, relatively movable chamber defining portions, said portions normally dividing the pressure chamber into a pair of cavities and being relatively movable first to establish communication between said cavities and then to enlarge the chamber, a fluid inlet being provided communicating with one of said cavities, a normally open vent port in one of said portions in communication with the other of said cavities, and a valve member mounted for movement in accordance with the relative movement between the portions with respect to said port to open and close said port, said valve being so arranged as to close said port upon relative movement of said portions to a predetermined extent in excess of the movement required to establish communication between said cavities.

8. In a fluid actuated variable volume pressure chamber means, a stationary member, a relatively movable wall member, said members defining a pressure chamber therebetween, said members including normally engaged portions dividing the pressure chamber into a pair of cavities, resilient means biasing said wall member to its normal position, said wall member being movable in response to fluid pressure first to establish communication between said cavities and then to enlarge the pressure chamber, a fluid inlet being provided communicating with one of said cavities, a normally open vent port in one of said members in communication with the other of said cavities, and a valve adapted to control said port operatively associated with the other of said members and movable in response to movement of said wall member to open and close said port, said valve being so arranged as to close said port upon relative movement of said members to a predetermined extent in excess of the movement required to establish communication between said cavities.

9. In fluid-actuated clutch and transmission mechanisms, a first member mounted for rotation, a second member associated with said first member and adapted to rotate therewith, said member defining a fluid pressure chamber therebetween, said second member being movable longitudinally of said first member in response to fluid pressure actuation, a normally open vent port in said first member extending transversely of the axis of rotation of said first member and communicating with said pressure chamber, and a valve member mounted in said first member adjacent the periphery thereof for movement in a path parallel to the axis of rotation of said first member, said valve member being associated with said vent port to control flow therethrough, said valve member being operatively associated with said second member to move with said second member with respect to said first member and said vent port, said valve member including a vent port closing portion normally disposed in an open position relative to said vent port, said valve member being movable with said second member to close said vent port only after a predetermined magnitude of movement of said second member upon fluid pressure actuation of said second member.

10. In fluid-actuated clutch and transmission mechanisms, a first member mounted for rotation, a second member associated with said first member and adapted to rotate therewith, said members defining a fluid pressure chamber therebetween, said second member being movable longitudinally of said first member in response to fluid pressure actuation, a normally open vent port in said first member communicating with said pressure chamber, a bore in said first member adjacent the periphery thereof, said bore extending parallel to the axis of rotation of said first member and intersecting said vent port, and a valve movably mounted in said bore for controlling said vent port, said valve being operatively associated with said second member to move with said second member with respect to said first member, said valve including a vent port closing portion normally disposed in an open position relative to said vent port, said valve being movable with said second member to close said vent port after a predetermined magnitude of movement of said second member with respect to said first member upon fluid pressure actuation of said second member.

11. In fluid-actuated clutch and transmission mechanisms having a plate, means for moving said plate in one direction, a fluid-actuated piston for moving said plate in the opposite direction, and a cylinder member in which said piston is slidably mounted, said piston and cylinder member defining a pressure chamber therebetween, said cylinder member being mounted for rotation but being held against axial movement; means for preventing accidental actuation of the plate due to the presence of residual fluid in the pressure chamber, said means including a pressure relief valve comprising a vent port in said cylinder member communicating with the pressure chamber defined by said cylinder and said piston, a bore in said cylinder member adjacent the periphery thereof, said bore extending parallel to the axis of rotation of said cylinder member and intersecting said vent port, said bore having its open end positioned adjacent said plate, and a spool valve movably mounted in said bore, said valve being operatively associated with said plate to move therewith, said valve being mounted in said bore with the reduced portion thereof intersecting said port to maintain said port open when said plate and piston are moved to normal position by said first named means, said valve being moved with said plate upon fluid pressure actuation of said piston to move an enlarged portion of said valve into a position intersecting said port to close said port when said plate is moved a predetermined distance in response to fluid actuation of said piston.

12. In fluid-actuated clutch and transmission mechanisms having a plate, means for moving said plate in one direction, a fluid-actuated piston for moving said plate in the opposite direction, and a cylinder member within which said piston is slidably mounted, said piston and cylinder member defining a pressure chamber therebetween, said cylinder member being mounted for rotation but being held against axial movement; means for preventing accidental actuation of the plate due to the presence of residual fluid in the pressure chamber, said means including a pressure relief valve comprising a vent port in said cylinder member communicating with the pressure chamber defined in said cylinder member and said piston, said vent port extending generally radially of said cylinder member, a bore in said cylinder member adjacent the periphery thereof, said bore extending parallel to the axis of rotation of said cylinder member and intersecting said vent port, said bore having its open end positioned adjacent said plate, a spool valve movably mounted within said bore, said valve being operatively associated with said plate for movement therewith in accordance with movement of said plate and said piston, said piston and said cylinder member having normally engaging portions dividing the pressure chamber into an inner annular cavity and an outer annular cavity, and a fluid inlet in communication with said inner cavity, said vent port communicating with said outer cavity, said piston being movable first to establish communication between said cavities and said vent port and thereafter being movable to enlarge the pressure chamber, said valve being so mounted in said bore that said port is open when said plate and piston are moved to a normal position by said first named means and that said port is closed when said plate and said actuator are moved a predetermined magnitude in excess of the said first movement of said piston in response to fluid actuation of said piston.

References Cited in the file of this patent

UNITED STATES PATENTS

| | | |
|---|---|---|
| 1,931,902 | Oyster | Oct. 24, 1933 |
| 1,934,850 | Fromaget | Nov. 14, 1933 |
| 2,178,017 | Fedden et al. | Oct. 31, 1939 |
| 2,204,672 | Folberth et al. | June 18, 1940 |
| 2,325,814 | Tyler | Aug. 3, 1943 |
| 2,386,220 | Lawler et al. | Oct. 9, 1945 |

FOREIGN PATENTS

| | | |
|---|---|---|
| 494,760 | Belgium | July 17, 1950 |
| 564,638 | Great Britain | Oct. 6, 1944 |
| 643,678 | Germany | Sept. 27, 1934 |
| 807,875 | Germany | Apr. 26, 1951 |